UNITED STATES PATENT OFFICE.

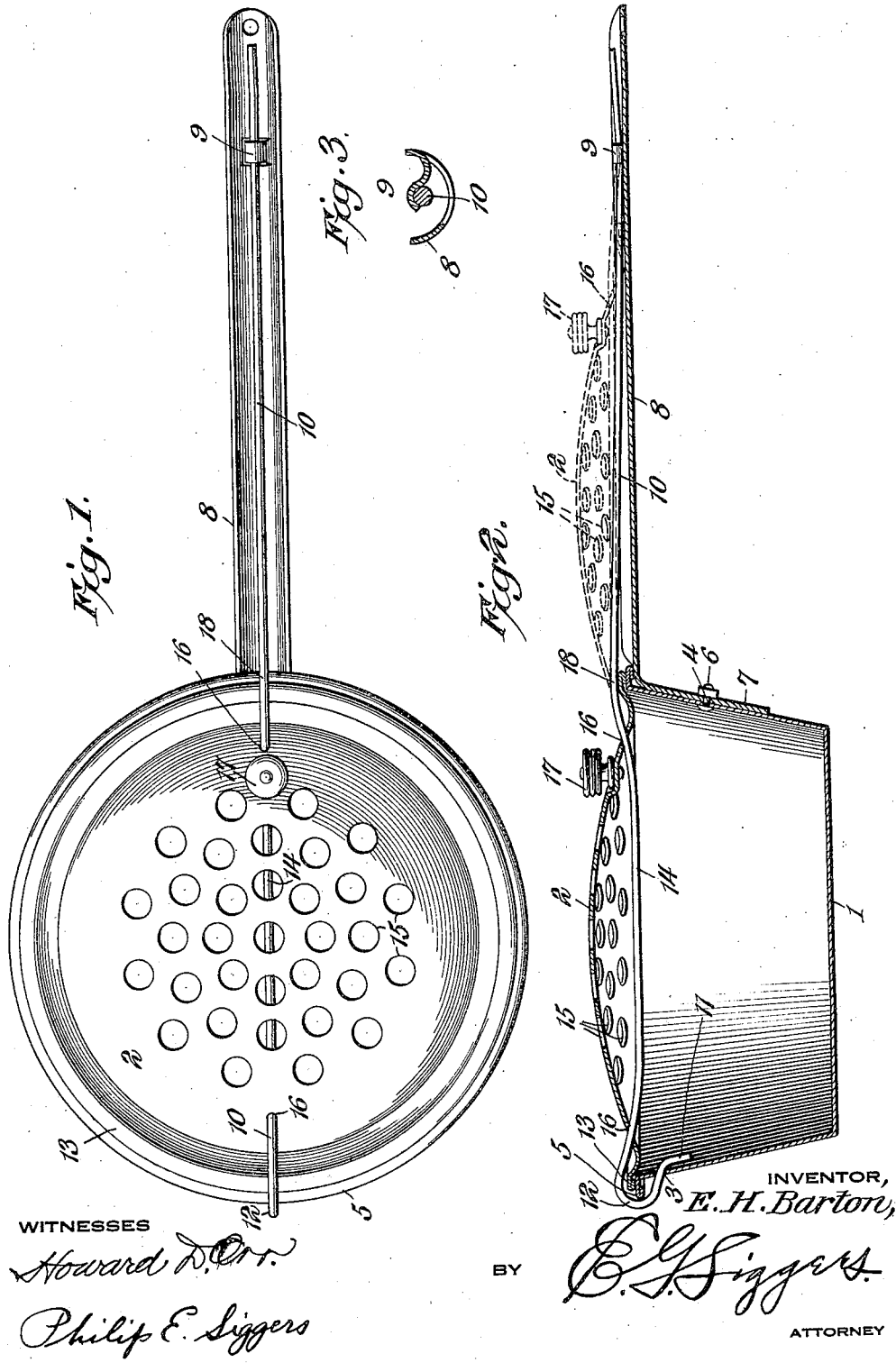

EDWARD H. BARTON, OF SPRAGUE, WASHINGTON.

CORN POPPER.

1,402,135.	Specification of Letters Patent.	Patented Jan. 3, 1922.

Continuation in part of application Serial No. 340,525, filed November 25, 1919. This application filed December 9, 1920. Serial No. 429,489.

*To all whom it may concern:*

Be it known that I, EDWARD H. BARTON, a citizen of the United States, residing at Sprague, in the county of Lincoln and State of Washington, have invented a new and useful Corn Popper, of which the following is a specification.

This invention relates to improvements in corn poppers.

The object is to simplify and improve the construction of corn poppers and to reduce the cost of manufacture thereof by reducing the number of component parts to a minimum, and at the same time provide for the necessary functions entailed in the operation of popping corn, the device of the present invention providing for readily charging the same with unpopped corn and confining the latter by means of a lid which is automatically locked into covering position, then permitting of easily shaking the device over the heating element, allowing the ready discharge of the unpopped corn and other refuse, and finally being easily opened to pour out the popped corn, all of which may be accomplished without danger of burning the hands.

Another object is to provide for the utilization of a pan of the ordinary round construction, together with the usual lid therefor, it being only necessary to alter the construction of the former by the provision of two oppositely disposed perforations therein for the purpose of applying certain parts and to provide certain perforations in said lid for the same purpose, thus obviating the necessity of special machines for this purpose and rendering it possible to use pans and lids already upon the market.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith but may be changed or modified, so long as such changes or modifications mark no material departure from the salient features of the invention, as specifically pointed out in the appended claims.

In the drawings, in which similar reference characters designate corresponding parts throughout the several figures, Fig. 1 is a plan view of a corn popper constructed in accordance with the present invention.

Fig. 2 is a longitudinal sectional view of the same, with the cover shown moved back over the handle in dotted lines.

Fig. 3 is a detail transverse sectional view through the handle of the corn popper.

The receptacle or pan 1 for containing the corn has been illustrated in the drawing as of the ordinary round construction, and having a lid or cover 2 adapted to fit over the same and to rest upon the top edge of the pan in the ordinary manner. It is to be understood, however, that the same may be of any other desired formation, as the device of the present invention is adapted to be as readily applied to one form as another.

At points diametrically opposite to each other, the substantially vertical wall of the pan is provided with perforations 3 and 4, respectively, the perforation 3 being located relatively close to the peripheral flange 5 provided at the top of said wall, and the perforation 4 being arranged somewhat lower. The perforation 4 is for the reception of a bolt 6 which also traverses a suitable perforation in the downturned portion 7 of a metallic handle 8, which is preferably formed of sheet metal of suitable strength and thickness to properly support the pan and curved transversely to increase the strength. The bolt 6 is equipped with the usual nut to clamp the member 7 tightly to the side of the pan and to hold the handle 8 rigidly in substantial horizontal alinement with the plane of the top edge of the pan.

Near the outer free end of the handle 8 there is provided an upstanding hook or keeper 9, formed by suitably slitting the handle to provide a tongue which is bent upwardly and suitably curved to provide a seat, the free end of said tongue being spaced away from the handle a sufficient distance to freely admit of the introduction of the free end of a lid-retaining and guiding rod 10. The rod 10, which is formed of relatively heavy spring wire, is adapted to normally lie in substantial alinement with the handle 8 and to be partially housed within the curvature thereof, the other end of the said rod being bent from the main portion of the rod and adapted to enter the perforation 3 formed in the side wall of the pan, and bent downwardly to form a hook 11 to lock the rod rigidly in position when the free end of the same is in engagement with the keeper 9. The curved loop 12, thus formed in the rod, is adapted to partly surround the flange 5 of the pan and the flange 13 of the lid 2 which rests thereon, and that portion of the rod 10 which crosses the upper portion of the pan is bent slightly downward or toward the pan as indicated at 14, for a purpose to be explained.

The lid or cover 2 is provided with the usual perforations 15 formed in the central portion thereof and is of concavo-convex formation, the concave side being arranged over the pan. Suitable diametrically opposed perforations 16 are provided in the lid adjacent to the flange 13 and are adapted to permit of the passage of the rod 10, and enable the lid to be moved backwardly and forwardly thereon in a longitudinal direction. A suitable button or handle 17 is secured to the lid in alinement with the perforations 16, and preferably adjacent to one of the latter, in order to locate the said button or handle to one side of the center of the pan and thus avoid the greatest heat. It will be observed that the rod, when it passes through the perforation 16 nearest the handle, extends upwardly and bears upon the flange 13 of the cover, as indicated at 18, and by reason of the resiliency of the rod, the latter holds the cover firmly in place, so that the shaking of the popper does not displace it from its position.

In using the device as a corn popper, it is only necessary to grasp the button or handle 17 and slide the lid 2 along the rod 10 toward the free end thereof, as indicated in dotted lines, Fig. 2, in order to charge the pan 1 with unpopped corn. The downwardly bent or curved portion 14 of the rod 10 will, while the free end of the said rod is engaged beneath the keeper 9, at all times exert a downward pressure upon the lid 2, thus keeping the same in close contact with the top of the pan. Upon sliding the lid back into covering position again as illustrated in the drawing, the pan may be reciprocated over the heating element in the usual manner to pop the corn, the perforations acting as a vent. When the corn is popped the pan may be inverted to pour out the unpopped corn through the perforations, as well as any other refuse matter such as chaff, the convex formation of the lid facilitating such action, when the lid may be again opened and the popped corn removed.

The entire device may be readily removed from the pan when it is desired to use the pan for other purposes, by simply releasing the rod 10 from engagement with the keeper 9, when the same may be moved longitudinally to withdraw the hook 11 from the perforation 3 and the rod together with the lid may be detached.

By utilizing an ordinary pan and lid, the cost of manufacture is greatly reduced, as the same may be readily adapted for the application of the handle and the lid-engaging rod by simply providing the necessary perforations, and it will be seen that the device is well adapted for other purposes than popping corn. Furthermore the device needs no assembling at the factory, as each part is a complete unit in itself, which is another item in its favor from a manufacturing standpoint.

This case is a continuation of the application filed by me Nov. 25, 1919, Serial No. 340,525, except as to hook 11.

What is claimed is:—

1. The combination with a pan having a projecting handle, of a cover, and a rod connected to the pan and to the handle, said rod providing holding means for the cover when over the pan and a guiding means for the cover when slid onto the handle.

2. The combination with a pan having a projecting handle, of a cover, a guiding and holding rod for the cover, and means for detachably connecting the rod to the pan, the cover and the handle, said rod providing holding means for the cover when over the pan and a guiding means for the cover when slid onto the handle.

3. The combination with a pan having a projecting handle, and a perforation formed in its wall, of a rod connected to the handle at the end remote from the pan and extending diametrically across the pan, said rod being formed with a curved portion near its other end and passed through the perforation in the pan and bent downwardly to form a hook, and a cover having alined perforations at spaced points through which said rod is passed, whereby said rod serves as holding means for the cover when over the pan and guiding means when slid away from the pan.

4. The combination with a pan having a projecting handle, of a cover having alined perforations, and a rod passed through said perforations and having a hook at one end to detachably engage the pan, and a keeper on the handle to engage the other end of the rod, said rod providing holding means for the cover when over the pan and guiding means when slid away from the pan.

5. The combination with a pan having a projecting handle, of a cover, a rod extending longitudinally of the handle and diametrically across the upper part of the pan, means for detachably connecting the rod to the pan, and means for detachably connecting the rod to the handle, said rod being slidably connected to the cover.

6. The combination with a pan having a projecting handle, of a cover having alined perforations at spaced points, a rod extending longitudinally along the handle and diametrically across the pan passing through the perforations in the cover, a hook at one end of the rod for detachably engaging the pan, a keeper on the handle for engaging the rod, that portion of the rod over the pan and between the perforations in the cover being bowed downwardly, said rod serving as holding and guiding means for the cover.

7. A corn popper comprising a pan having a perforation formed in its wall, a handle secured to the pan at a point diametrically opposite the perforation, a keeper provided on the handle, a rod having a hook formed at one end to engage said perforation, said rod lying across the pan and along the handle and normally in engagement with said keeper, said rod having a bowed or depressed portion where crossing the pan, and a perforated concavo-convex lid having other alined perforations to receive the rod at the bowed portion thereof and adapted to be clamped down upon the pan by the bowed portion of the rod and to be moved along the same to cover or uncover the pan.

In testimony that I claim the foregoing as my own I have hereto affixed my signature.

EDWARD H. BARTON.